2 Sheets—Sheet 1.

A. J. HISCOTT.

DIE FOR MAKING SEAMLESS DRESS SHIELDS.

No. 10,772. Reissued Oct. 19, 1886.

Witnesses
Edward F. Meeker
S. S. Williamson

Inventor
Alva J. Hiscott
By Smith & Hubbard
Attys.

N. PETERS, Photo-Lithographer, Washington, D. C.

2 Sheets—Sheet 2.

A. J. HISCOTT.

DIE FOR MAKING SEAMLESS DRESS SHIELDS.

No. 10,772. Reissued Oct. 19, 1886.

Witnesses
Edward D. Mecker
S. S. Williamson

Inventor
Alva J. Hiscott
By Smith & Habbard
Attys.

N. PETERS, Photo-Lithographer, Washington, D. C.

UNITED STATES PATENT OFFICE.

ALVA J. HISCOTT, OF BRIDGEPORT, CONNECTICUT.

DIE FOR MAKING SEAMLESS DRESS-SHIELDS.

SPECIFICATION forming part of Reissued Letters Patent No. 10,772, dated October 19, 1886.

Original No. 339,294, dated April 6, 1886. Application for reissue filed August 2, 1886. Serial No. 209,808.

*To all whom it may concern:*

Be it known that I, ALVA J. HISCOTT, a citizen of the United States, residing at Bridgeport, in the county of Fairfield and State of Connecticut, have invented certain new and useful Improvements in Dies for Making Seamless Dress-Shields; and I do hereby declare the following to be a full, clear, and exact description of the invention, such as will enable others skilled in the art to which it appertains to make and use the same.

My invention relates to certain novel and useful improvements in dies for forming seamless dress-shields, and has for its object to do away with the crescent-shaped dies between which the fabric is shaped, and, furthermore, to produce a most economical shield, which shall also be superior in finish and durability to any shield at present in the market; and with these ends in view my invention consists in a pair of dies, which should be heated when used, which latter shall be so constructed as to uniformly stretch the fabric and to take up the cockles or wrinkles incident to the stretching without undue strain on the fabric.

In order that those skilled in the art to which my invention appertains may fully understand its construction and operation, I will proceed to describe the same in detail, referring by letter to the accompanying drawings, forming a part of this specification, in which—

Figure 1:
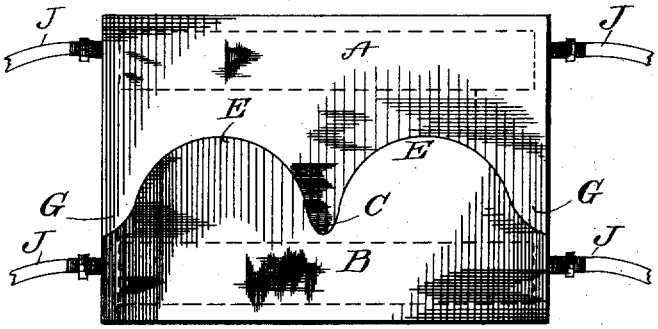
Figure 2:
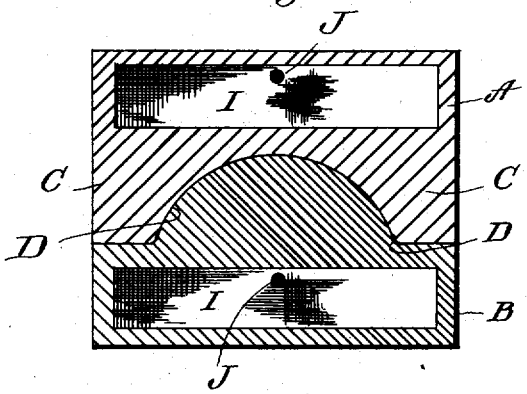
Figure 3:
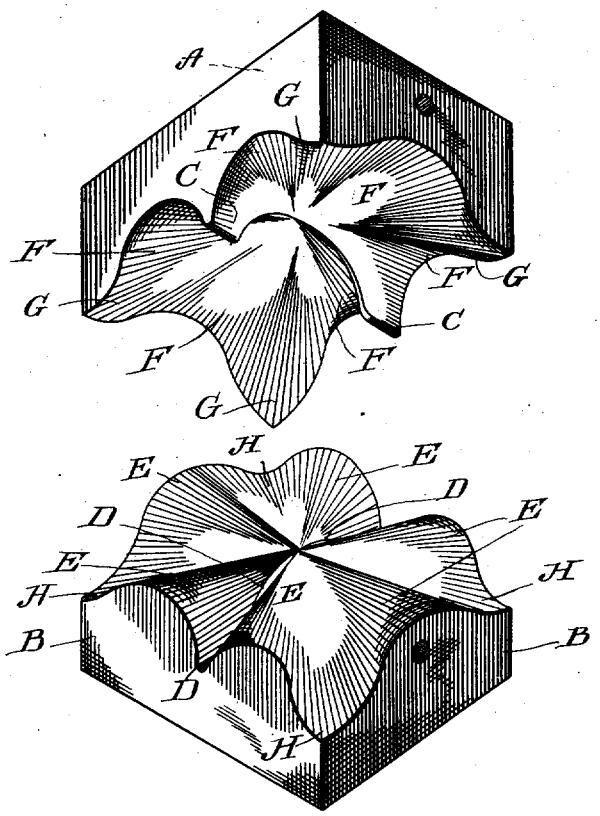

Figure 1 is a side elevation of the dies; Fig. 2, a central vertical cross-section of the dies, and Fig. 3 a perspective of the upper and lower dies separated.

Similar letters denote like parts in the several figures of the drawings.

A is the upper die, and B the lower.

C is a shaper of crescent form, which depends from the die, and D is a corresponding depression (see Fig. 3) in the lower die, to which the contour of said shaper is adapted.

E are radial corrugations in the lower die, adapted to take up the cockles or wrinkles in the fabric when the latter has been stretched, as will hereinafter be set forth.

F are corresponding depressions in the upper die, to which said corrugations are closely adapted, and G H are the similar counter-radial corrugations and depressions in the upper and lower dies, respectively.

Both dies each have a steam or hot air chest, I, (see Fig. 2,) supplied by pipes J.

In carrying out my improved method, I proceed as follows: The fabric (which is preferably rubber faced with stockinet) is placed on the lower die and the upper die brought down. As the shaper C forces the fabric within the depression D it will of course stretch, and the corrugations E G and depressions F H gradually press upon the fabric, the radial wrinkles in the latter incident to the stretching will be taken up by said corrugations and depressions, thereby preventing any creasing. Steam or hot air is now introduced within the dies, and the rubber thereby vulcanized in its stretched shape.

Prior to my invention dress-shields have been formed by forcing the fabric within a female die by means of a male former made from sheet-iron; but, owing to the fact that the external curvature of the edges of the female die determined the degree of stretching, the fabric was generally distorted, and in many instances the stockinet was torn. Furthermore, in order to get rid of the wrinkles which form during the stretching, it was necessary that the fabric should draw tightly against the said edges, and that the male former should force the fabric to a considerable distance within the female die, and this of course contributed greatly to the irregular stretching. Also, in order to retain the fabric in its stretched shape, it has been necessary hitherto to remove the fabric from the former and fasten it on tin shapers and then subject it to the action of heat.

By my improved dies the vulcanization is simultaneous with the stretching, which of itself is a great gain of time.

The principle which underlies my improvement is that the degree of stretching the fabric so that it will, when finished, assume the concave shape increases uniformly from the center. Therefore the cockles or wrinkles will be radial, and accordingly the radial corrugations and depressions will act as "take-ups" for the said cockles, and the fabric can be gradually taken up until it is firmly held throughout its area, and can be uniformly stretched without any liability of creasing.

I prefer to keep the dies constantly heated, so as to be ready for instant use when it becomes necessary to make any considerable number of shields.

I am enabled to manufacture dress shields having different styles or degrees of concave by using different dies, and it is in some instances more convenient and advantageous to have more or less corrugations and depressions, and I do not therefore wish to be confined to any particular number or formation of said corrugations and depressions. Also, I am enabled to use any suitable material in the manufacture of dress-shields other than rubber faced with stockinet, and this is a great advantage, since many fabrics which are suitable for this manufacture cannot be utilized in the method hitherto employed, owing to the fact that said fabrics will not withstand the strain caused by forcing and stretching them between dies.

Having thus described my invention, what I claim as new, and desire to secure by Letters Patent, is—

As a new article of manufacture, a pair of dies for manufacturing seamless dress-shields, the male die having a crescent-formed shaper and the female die a corresponding depression, whereby the concavity is given to the upper edge of the shield, the dies having corresponding male and female corrugations and depressions which radiate from a common vertical center, whereby the cockles or wrinkles incident to the operation of the crescent shaper are taken up, and creasing thereby prevented, one or both of said dies being provided with means for heating the same, substantially as set forth.

In testimony whereof I affix my signature in presence of two witnesses.

ALVA J. HISCOTT.

Witnesses:

F. W. SMITH, Jr.,

S. S. WILLIAMSON.